Sept. 20, 1971     L. GSCHWENDTNER     3,605,505

DEVICE FOR MOVING HEAVY MACHINE PARTS IN THEIR GUIDE

Filed May 23, 1969

INVENTOR
LEONHARD GSCHWENDTNER

BY
Woodhams, Blanchard & Flynn
ATTORNEYS

United States Patent Office 3,605,505
Patented Sept. 20, 1971

3,605,505
DEVICE FOR MOVING HEAVY MACHINE PARTS IN THEIR GUIDE
Leonhard Gschwendtner, Munich, Germany, assignor to Friedrich Deckel Prazisions Mechanik & Maschinenbau, Munich, Germany
Filed May 23, 1969, Ser. No. 827,311
Claims priority, application Austria, June 4, 1968, A 5,314/68
Int. Cl. F16h *19/06*
U.S. Cl. 74—37  2 Claims

ABSTRACT OF THE DISCLOSURE

A device for permitting controlled relative movement between machine parts, particularly between a worktool spindle support member and its associated guideway. One of the parts is provided with an endless chain thereon, one reach of the chain being in driving engagement with a catch lug fixedly secured to the other part. The other part is preferably provided with a plurality of spaced catch lugs therealong adapted to intermittently engage the chain whereby the one part can be linearly moved relative to the other part through a distance substantially greater than the longitudinal length of the one reach of the chain.

---

This invention relates to a chain device for permitting relative movement between machine parts and, in particular, relates to an endless chain connected to one machine part and cooperating with a plurality of spaced catch lugs provided on the other machine part for permitting relative movement between the machine parts through a distance substantially greater than the effective length of the chain.

For the movement of heavy machine parts in their guide, in particular if the moving is to be done manually, devices are used through which the force which is to be applied and which must overcome the friction in the guide is assisted by a corresponding reduction of the speed of movement. The invention relates to a device of this type. Toothed racks are commonly used heretofore, said toothed rack being secured in one of the two parts movable against one another and said toothed rack being engaged by a spur gear supported in the other part. The gear is driven through a crank. The toothed rack is at least as long as the entire path of movement. To save expenses, instead of a toothed rack, a roller chain has also already been used, said roller chain being secured to the machine part under a rigid longitudinal stress.

The great length of the toothed rack or the roller chain is disadvantageous for long paths of movement wherein the installation of same in a cramped location is difficult. The invention helps to overcome this.

The invention lies in the provision of an endless chain drive in the machine part to be moved (or in the structural part containing the guide) in which at least one reach thereof extends parallel to its path of movement, said reach being engaged by at least one catch tooth which is secured to the structural part containing the guide (or on the machine part to be moved).

The chain can be constructed as a double chain, the one side of which is used for the sprocket of the chain drive while the catch teeth engage the other side. In using a single chain, according to a further characteristic of the invention, a tooth is omitted from the sprockets of the chain drive, insofar as same are constructed as toothed chain wheels, at the place or places of engagement of the catch tooth or teeth.

If one wants to remove only one single tooth of the chain wheel or wheels, which is advisable in the case of chain wheels with only a few teeth, then the distance of the catch teeth must be a multiple of the product of the number of teeth $z$ and of the tooth division $t$. In order to obtain an even number of chain links on the chain to avoid a bent connecting link, in the case of parallel guided reaches of the chain drive, its axial distance must be $A = n \times (z+0.5)\,t$ at an uneven number of teeth or $A = n \times (z+1)\,t$ at an even number of teeth whereby $n$ is any desired whole number. It is then only necessary to remove one single tooth from the chain wheel or wheels of the chain drive whereby the number of teeth of the two chain wheels must be the same.

In place of catch teeth which are secured to one of the parts, the chain can also be provided with drive devices which engage corresponding recesses of the other part. Such a construction is advantageous for example if only small chain wheels with a small number of teeth are to be used at which the removal of one tooth would not be desirable.

An exemplary embodiment of the invention is illustrated in the drawings in which.

Figures 2, 3:
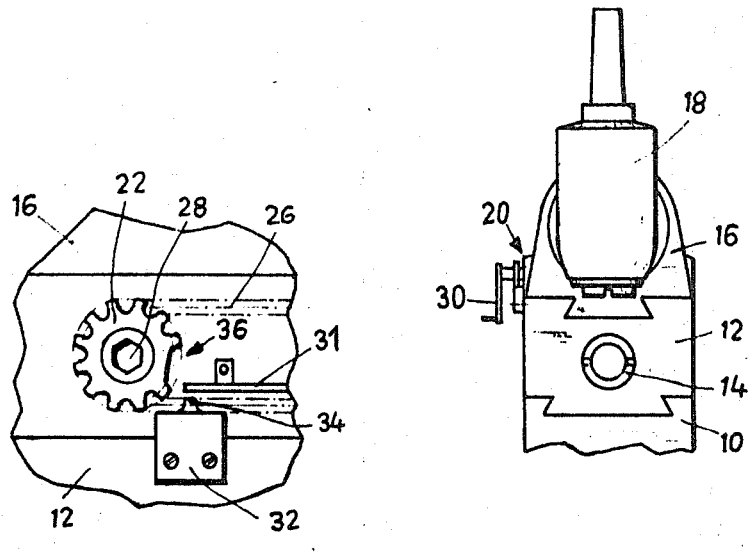
FIG. 3 is a detail of FIG. 1 in an enlarged scale.

A spindle socket 12 with a horizontal spindle 14 is horizontally movable on the base 10 of a universal milling machine. A further spindle socket 16 is movable in the same direction on the spindle socket 12, said spindle socket 16 having at its front side a vertical spindle head 18. A chain drive, identified as 20, is secured to one side surface of this spindle socket 16, said chain drive consisting of two sprockets 22 and 24 and one endless roller chain 26, the reaches of which are parallel to one another and extend in the direction of movement of the spindle socket 16. At least one of these sprockets 22 and 24 is geared and has a polygonal-shaped (hexagonal) recess 28 into which a hand crank 30 is inserted for driving. A cover rail 31 (FIG. 3) is secured on the spindle socket 16 above the lower chain reach, which cover rail prevents a rising of the chain.

Several anchor devices 32 are connected by screws to the spindle socket 12 in such a manner that a tooth 34 constructed at its upper side projects into the zone of the roller chain 26 and engages between two adjacent rollers of same. The tooth on the geared sprocket or sprockets 22 and 24 corresponding to this engagement zone is milled away at 36.

Figure 1:
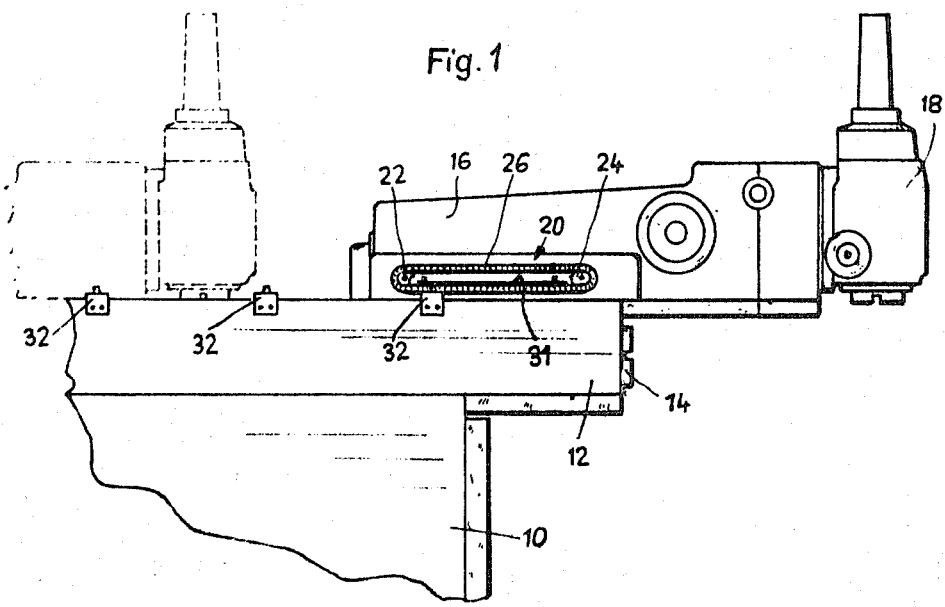
FIGS. 1 and 2 are a side-elevational view or a front view of the upper part of a universal milling machine.

The longitudinal spacing of the two sprockets 22 and 24 is considerably less than the permissible longitudinal (entire path of) movement of the spindle socket 16 which is indicated in FIG. 1 by a dashed illustration of its rear limit position. The distance between the anchor devices 32 is chosen so that at all times at least one lug 34 is in engagement with the chain 26.

In operation, movement of part 16 from the solid line position to the dotted line position of FIG. 1 occurs due to rotation of sprocket 22 by means of crank 30, whereupon the chain 26 engages the first stationary lug 34 formed on the first anchor device 32 (rightward anchor device illustrated in FIG. 1) so that the part 16 is moved rearwardly (leftwardly in FIG. 1). As the chain 26 is about to disengage the rightward anchor device 32, the endless chain 26 engages the intermediate anchor device 32 so as to permit continued movement of the part 16. Further, leftward movement of the part 16 will cause the chain 26 to come into driving engagement with the leftward anchor device 32 prior to or substantially simultaneously with the disengagement of the chain 26 from the center anchor device 32. In this manner, the part 16 can be moved through a distance substantially in excess of the length of the reaches of the chain 26.

The embodiments of the invention in which an exclusive property or privilege is claimed are defined as follows:

1. A device for permitting controlled movement between parts on a machine, comprising:
    frame means;
    carriage means movably mounted on said frame means;
    a pair of spaced sprockets on one of said carriage means and said frame means, at least one of said sprockets being rotatably driveable, said spacing between said sprockets being less than the length of movement of said carriage means on said frame means;
    an endless link chain supported by said pair of said spaced sprockets and driven by said driveable sprocket; and
    a plurality of catch teeth secured to the other of said frame means and said carriage means, the spacing between each of said plurality of catch teeth being at most equal to the spacing between said sprockets and a multiple of the spacing between the chain links, at least one catch tooth at a time engaging a reach of said endless link chain so that a rotatable driving of said driveable sprocket will cause a relative movement between said frame means and said carriage means.

2. A device according to claim 1, wherein one tooth on at least one of the spaced sprockets is missing to permit said carriage means to move past each of said catch teeth without any interference between said sprockets and said catch teeth.

References Cited

UNITED STATES PATENTS

| 2,309,578 | 1/1943 | Drachman | 74—37 |
| 2,685,260 | 8/1954 | Auger | 74—37 |

FOREIGN PATENTS

| 912,328 | 12/1962 | Great Britain | 74—37 |

WILLIAM F. O'DEA, Primary Examiner

W. S. RATLIFF, Jr., Assistant Examiner